United States Patent Office 3,288,764
Patented Nov. 29, 1966

3,288,764
CURING OF CHLOROSULFONATED
POLYETHYLENE
Moyer M. Safford, Schenectady, N.Y., assignor to General
Electric Company, a corporation of New York
No Drawing. Filed July 23, 1963, Ser. No. 296,928
9 Claims. (Cl. 260—79.3)

This invention is concerned with the vulcanization of chlorosulfonated polyethylene elastomers, and more particularly to a method of curing said elastomers with a certain class of chloroplatinic acid compounds, and products obtained therefrom.

It is known that chlorosulfonated hydrocarbon polymers can be cured by heating them with a polyvalent metal hydroxide and oxides such as lead monoxide (litharge) and magnesium oxide (magnesia). However, the procedures available in the art have not been entirely satisfactory. Although stocks cured with litharge display good heat resistance, they tend to discolor; litharge, moreover, is a toxic compound. Although magnesia is non-toxic and the vulcanizates cured with it do not discolor, nevertheless, it has been necessary to use very high magnesia concentrations to obtain vulcanizates with acceptable properties. In addition, such stocks tend to be scorchy and their vulcanizates, particularly when highly loaded with inorganic fillers need improved heat resistance; economically, too, they are less attractive because magnesia is far more expensive than litharge.

I have unexpectedly discovered that chlorosulfonated polyethylene can be readily vulcanized by an entirely new class of vulcanizing agents whereby generally lower temperatures of vulcanization can be used than are required by the usual vulcanizing agents; furthermore light-colored products can be obtained in contrast to the discolored products with magnesia. More particularly, I have discovered that the above-described chlorosulfonated polyethylene can be readily vulcanized by a chloroplatinic acid compound employing the vulcanizing agent in a minor weight proportion of the total weight of the vulcanizing agent and the chlorosulfonated polyethylene. Preferably, the vulcanizing agent comprises from about 0.1 to about 10 to 20 percent, by weight, based on the weight of the chlorosulfonated polyethylene.

The chlorosulfonated products used are derived from linear polyethylenes, characterized by complete or almost complete absence of chain branching, densities greater than 0.935 and usually greater than 0.950, solubility in carbon tetrachloride so as to give at least 1 percent solution at 25 to 125° C. and a melt index (see ASTM–D–1238–52T) between about 0.5 and about 20. The chlorine content is usually between 25 and 55 percent and preferably between 30–45 percent. The sulfur content is usually between 0.1 and 3.0 percent and preferably between 0.6 and 2.0. The chlorosulfonation of polyethylene is broadly disclosed and described in U.S. Patent 2,586,363. Chlorosulfonated linear polyethylenes of high chlorine content utilized according to this invention may be prepared by chlorosulfonating polyethylenes produced, for example, by the methods disclosed in U.S. Patents 2,762,791 and 2,816,883 as well as by the so-called coordination polymerization described in U.S. Patent 2,799,668. The method utilized for chlorosulfonating these polyethylenes may be such as that described in U.S. Patent 2,586,363 to McAlevy. Preferably, the products of this invention are made by passing a mixture of chlorine and sulfur dioxide, into a solution of the polyethylene in an inert solvent such as carbon tetrachloride. It is usually advantageous to promote the reaction by means of a source of free radicals such as the organic peroxides or the aliphatic azo compounds described for such purpose by Ernsberger in U.S. Patent 2,503,252. The chlorination and chlorosulfonation procedures may be carried out either as batch operations or continuously.

The chlorosulfonated products may be isolated from the reaction mixture, for example, by removing the solvent by steam distillation as described by Ludlow in U.S. Patent 2,592,814, in which a stream of the solution is introduced transversely into a steam jet submerged in an alkaline solution of a dispersing agent, whereby the products are atomized and freed of carbon tetrachloride, forming granular particles.

In accordance with my invention, I incorporate in the chlorosulfonated polyethylene a minor proportion of a chloroplatinic acid compound prepared by forming a reaction mixture of (A) chloroplatinic acid with (B) at least 2 moles per gram atom of platinum of a member selected from the class consisting of alcohols having the formula R'OH, ethers having the formula R'OR', aldehydes having the formula R'CHO, and mixtures thereof and heating said reaction mixture at a temperature of from about 60 to 80° C. at a reduced pressure until the reaction product has a ratio of from about 2.0 to about 3.5 atoms of chlorine per atom of platinum, where R' is a member selected from the class consisting of alkyl radicals containing at least 4 carbon atoms, alkyl radicals substituted with an aromatic hydrocarbon radical, and alkyl radicals substituted with an OR'' group, where R'' is a member selected from the class consisting of monovalent hydrocarbon radicals free of aliphatic unsaturation and monovalent radicals free of aliphatic unsaturation and consisting of carbon, hydrogen and oxygen atoms, with each oxygen atom being attached to two other atoms, one of which is a carbon atom and the other of which is a member selected from the class consisting of a carbon atom and a hydrogen atom.

The chloroplatinic acid compound (hereinafter so designated) and methods for preparing such compositions are more particularly disclosed and claimed in copending application of Harry F. Lamoreaux, Serial No. 207,076, filed July 2, 1962, and assigned to the same assignee as the present invention. The precise chemical nature of the chloroplatinic acid compound is not known with certainty. However, it is known that such compounds are quite different from the chloroplatinic acid starting material. Whereas chloroplatinic acid contains six chlorine atoms per platinum atom, the vulcanizing agent for the present invention contains from 2.0 to 3.5 chlorine atoms per platinum atom. Chloroplatinic acid is soluble in water and polar organic materials, such as simple alcohols and insoluble in conventional hydrocarbon solvents such as benzene and toluene, while the chloroplatinic acid compound is insoluble in water, but soluble in benzene or toluene.

One method for preparing the chloroplatinic acid compound and particularly the octoate derivative is as follows: 1 mole of chloroplatinic acid hexahydrate is mixed with seven moles of octyl alcohol, until a solution is formed. The reaction mixture is then heated to a temperature of 70° C. and maintained at this temperature under a pressure of 25 millimeters. Hydrogen chloride and water which are formed during the reaction are immediately removed from the reaction mixture as formed. The reaction mixture is maintained under the pressure and temperature conditions recited for 40 hours. The course of the reaction is followed by withdrawing portions of the reaction mixture and examining the material withdrawn. During the course of the reaction, the chlorine to platinum ratio gradually falls from 6 atoms of chlorine per atom of platinum to 2 atoms of chlorine per atom of platinum. During this same period, infrared analysis indicates a reduction of the hydroxyl content of the reaction mixture. At the same time, an ether band and an aldehyde band are generated. At the end of 40 hours, infrared analysis indicates a constant level of hydroxyl groups, carbonyl groups and ether linkages. At the end of 40 hours, the reaction mixture is allowed to cool to room temperature at atmospheric pressure and the product is extracted with hexane, filtered, and hexane removed from the filtrate under vacuum. At this point, the chloroplatinic acid compound appears to be a complex of $PtCl_2$ and an ether and aldehyde derived from octyl alcohol. The complex can also involve some other residue of the octyl alcohol, or the octyl alcohol can still be present as a solvent. In order to examine the product further, a portion of the reaction mixture is heated at 70° C. at 2 millimeters and maintained under these conditions to remove excess alcohol until infrared analysis no longer indicates the presence of hydroxyl groups. This material is then dissolved in hexane and filtered and hydrogen is bubbled through the filtrate to form a precipitate. Examination of the liquid filtrate shows only a trace of platinum. By an infrared comparison analysis against pure octyl aldehyde and octyl ether, the liquid is shown to contain 47.1 percent octyl ether and 12.8 percent octyl aldehyde. The remainder is identified as a hydrocarbon resin. From these data, it appears that the initial complex contained 1 mole of octyl aldehyde to 2 moles of octyl ether and 1 mole of platinum to 2 moles of chlorine. This evidence also indicates that the octyl alcohol in the composition was present only as a solvent.

A further indication of the fact that the catalyst just described is a complex of $PtCl_2$ and an aldehyde and an ether is indicated by the fact that when a mixture of 1 mole of chloroplatinic acid hexahydrate and 1 mole of octyl aldehyde and 2 moles of octyl ether are heated at a temperature of 70° C. at a pressure of 20 millimeters for 25 hours, the product formed is indistinguishable from the product prepared by heating the chloroplatinic acid with octyl alcohol.

Among the alcohols of the formula R'OH which are used in the preparation of the chloroplatinic acid compound are those in which the hydroxyl group is attached to a hydrocarbon atom containing at least 4 carbon atoms, for instance butanol, isobutanol, amyl alcohol, isoamyl alcohol, octyl alcohol, 2-ethylhexanol, tertiary butyl alcohol, undecanol, myricyl alcohol, etc. Another useful class of alcohols to make the chloroplatinic acid compound are the monoalkyl ethers of alkylene glycols and polyalkylene glycols, for instance the monomethyl ether of ethylene glycol, the monobutyl ether of ethylene glycol, the monobutyl ether of diethylene glycol, and the monomethyl ethers of higher polyalkylene glycols, such as the monoethyl ethers of higher ethylene glycols and propylene glycols, etc. Included among the alcohols are the cyclic alcohols, such as cyclohexyl alcohol, etc. The preferred alcohol for use for the practice of the present invention is octyl alcohol.

Aldehydes of the formula R'CHO which can be employed are those where R' has the same meaning as given in connection with alkanols and include aldehydes in which the R' group contains from 5 to 15 carbon atoms, for instance, amyl aldehyde, octyl aldehyde, 2-ethylhexyl aldehyde, undecanal, myricyl aldehyde, etc.

Ethers which can be employed in making the chloroplatinic acid compound of the formula R'OR' include those in which both the organic groups attached to the ethereal oxygen atom contain at least 4 carbon atoms, for example, from 4 to 14 carbon atoms, for instance dibutyl ether, ditertiary butyl ether, diamyl ether, dioctyl ether, di-2-ethylhexyl ether, dimyricyl ether, etc.

The preferred aldehyde and the preferred ether for making the chloroplatinic acid compounds are octyl aldehyde and dioctyl ether.

Other methods for making these chloroplatinic acid compounds are described in the aforesaid Lamoreaux application which, by reference, is made part of the disclosures and teachings of the instant application.

It is apparent that some of the alcohols, aldehydes or ethers which are reacted with chloroplatinic acid to form the compound used in the practice of the present invention are solid materials which do not have melting points below the 60 to 80° C. temperature at which reaction is ordinarily effected. Where such a material is employed as a reactant, it is desirable to add an inert solvent to the reaction mixture to facilitate the reaction. Suitable solvents include the various hydrocarbon solvents such as benzene, toluene, xylene, mineral spirits, etc. In general, it is desirable to select a solvent which will evaporate from the reaction mixture under the reaction conditions.

As pointed out above, the concentration of the chloroplatinic acid compound can be varied widely but preferably comprises on a weight basis from 0.1 to 10 percent, based on the weight of the chlorosulfonated polyethylene. As the concentration of the vulcanizing agent increases the rate of cure also increases.

The manner in which the invention may be practiced may be varied widely. The mixture of ingredients is preferably formed into a homogeneous moldable mass by the use of rubber milling rolls. Thereafter, the milled mass may be placed in a suitable mold and treated under pressures varying, for example, from 250 to 2000 p.s.i. for times ranging from about 10 to 90 minutes or more at temperatures ranging from about 100 to 150° C. These conditions, of course, may be varied or extended depending on the polymers used, the vulcanizing system, the proportion of ingredients including the vulcanizing catalyst, the application intended, etc.

In order that those skilled in the art may better understand how the present invention may be practiced, the following examples are given by way of illustration and not by way of limitation. All parts are by weight including the values shown in the table below with the exception of the values for the sample numbers and the physical properties.

*Example 1*

A chloroplatinic acid compound employed in the present invention was prepared by dissolving 1 part by weight of chloroplatinic acid hexahydrate in ten parts of n-octyl alcohol and heating the solution at 70 to 75° C. at 25 millimeters for 16 hours during which time all water and hydrogen chloride was removed. The pressure was then reduced to 5 millimeters to remove all unreacted octyl alcohol. At the end of this time a product was obtained which was a dark, reddish-brown liquid soluble in alcohols, acetone, benzene, hexane, xylene, toluene and other common solvents. Chemical analysis of this mixture showed it to contain 3.5 atoms of chlorine per atom of platinum and 0.035 gram platinum per gram of the mixture. This octoate derivative of chloroplatinic acid will hereinafter be designated as "chloroplatinic acid octoate."

*Example 2*

50 parts of chlorosulfonated linear polyethylene of about 35 percent chlorine and about 2.7 percent sulfur made from polyethylene having a density of about 0.96 and a melt index of 0.6 was mixed with varying amounts of the octoate derivative of chloroplatinic acid described in Example 1. As a control, the same chlorosulfonated polyethylene was also employed without any chloroplatinic acid compound. Each mixture of ingredients or the chlorosulfonated polyethylene alone was heated for 30 minutes at 150° C. at a pressure of 1000 p.s.i. in a flat mold to yields sheets which were tested for tensile strength and percent elongation at room temperature. The following Table 1 shows the ingredients used, the percentage of the ingredients, together with the physical properties of the cured samples.

TABLE 1

| | Sample Numbers | | | | |
|---|---|---|---|---|---|
| | 1 | 2 | 3 | 4 | 5 |
| Chlorosulfonated Polyethylene | 50 | 50 | 50 | 50 | 50 |
| Chloroplatinic Acid Octoate | | 0.4 | 0.8 | 1.6 | 3.2 |
| Physical Properties: | | | | | |
| Tensile, p.s.i. | 99 | 124 | 289 | 810 | 923 |
| Percent Elongation | 547 | 1,278 | 1,393 | 907 | 700 |

*Example 3*

When chloroplatinic acid pentanoate (prepared similarly as in Example 15 of the aforesaid Lamoreaux application or substituting n-pentanol for the octyl alcohol of the above Example 1) is substituted for the chloroplatinic acid octoate of Example 2, in an amount equal to 3.2 percent of the weight of the chlorosulfonated polyethylene, rapid vulcanization and crosslinking are obtained by the use of elevated temperatures as shown in Example 2.

It will, of course, be apparent to those skilled in the art that various modifying agents including various fillers, for example, carbon black, titanium dioxide, lithopone, various clays, iron oxides, etc., including plasticizers and other modifying resins and polymers, for instance, various polyethylenes, polypropylenes, rubbery polymers of butadiene and acrylonitrile or styrene, phenolic resins, etc., may be added without departing from the scope of the invention.

In addition it is intended that other types of chlorosulfonated polyethylene of different degrees of chlorination and sulfonation, many examples of which have been given above, may be used within the scope of the invention. Furthermore, other chloroplatinic acid compounds derived from alcohols, aldehydes, or ethers with chloroplatinic acid may be employed, many examples of which have been described above and in the above-mentioned application of Harry F. Lamoreaux.

The proportion of the vulcanizing agent in the chlorosulfonated polyethylene can be varied within wide limits as previously pointed out. As the proportion of the vulcanizing agent increases, the rate of vulcanization will also increase and vulcanization will be more rapid with increases in temperature.

Finally, the various conditions disclosed in the foregoing example, for instance, times of heating and temperature, concentration of ingredients etc., may be varied at will depending upon the application involved and upon the properties desired in the final product. The exact procedure in preparing the claimed composition of matter may, of course, be varied using procedures now well known in the art.

My invention is useful and has particular application in places where the usual chlorosulfonated polyethylene has been employed in the past. By means of my invention added protection at elevated temperatures is afforded by means of the crosslinking action of the chloroplatinic acid compound. Among such uses may be mentioned as electrical insulation, clothing, for protective purposes, etc. These cross-linked polymers can be used to make mechanical goods such as hose, belting, packing, tape and the like, shoe soles and heels, white sidewalls for tires, jacketing for wire and cable, etc.

What I claim as new and desire to secure by Letters Patent of the United States is:

1. A vulcanizable composition of matter comprising (1) a chlorosulfonated polyethylene and (2) a minor proportion of a chloroplatinic acid compound prepared by forming a reaction mixture of (A) chloroplatinic acid with (B) at least 2 moles per gram atom of platinum of a member selected from the class consisting of alcohols having the formula R'OH, ethers having the formula R'OR', aldehydes having the formula R'CHO, and mixtures thereof, and heating said reaction mixture at a temperature of from about 60 to 80° C. at a reduced pressure until the reaction product has a ratio of from about 2.0 to about 3.5 atoms of chlorine per atom of platinum, where R is a member selected from the class consisting of alkyl radicals containing at least 4 carbon atoms, alkyl radicals substituted with an aromatic hydrocarbon radical, and alkyl radicals substituted with an OR'' group, where R'' is a member selected from the class consisting of monovalent hydrocarbon radicals free of aliphatic unsaturation and monovalent radicals free of aliphatic unsaturation and consisting of carbon, hydrogen and oxygen atoms, with each oxygen atom being attached to two other atoms, one of which is a carbon atom and the other of which is a member selected from the class consisting of a carbon atom and a hydrogen atom.

2. The heat-treated product of claim 1.

3. A vulcanizable composition of matter comprising chlorosulfonated polyethylene and a vulcanizing agent for the latter comprising a minor proportion of a chloroplatinic acid octoate prepared by forming a reaction mixture of (A) chloroplatinic acid with (B) at least 2 moles per gram atom of platinum of n-octyl alcohol, and heating said reaction mixture at a temperature of from about 60 to 80° C. at a reduced pressure until the reaction product has a ratio of from about 2.0 to about 3.5 atoms of chlorine per atom of platinum.

4. The heat-treated product of claim 3.

5. A vulcanizable composition as in claim 1 where the chloroplatinic acid compound is chloroplatinic acid pentanoate prepared by forming a reaction mixture of (A) chloroplatinic acid with (B) at least 2 moles per gram atom of platinum of n-pentanol, and heating said reaction mixture at a temperature of from about 60 to 80° C. at a reduced pressure until the reaction product has a ratio of from about 2.0 to about 3.5 atoms of chlorine per atom of platinum.

6. The composition of claim 1 where the chlorine content of said chlorosulfonated polyethylene is between 25 and 55 percent, by weight, and the sulfur content between 0.1 and 3.0 percent, by weight.

7. The process for curing chlorosulfonated polyethylene which comprises incorporating in said chlorosulfonated polyethylene a minor proportion of a chloroplatinic acid compound prepared by forming a reaction mixture of (A) chloroplatinic acid with (B) at least 2 moles per gram atom of platinum of a member selected from the class consisting of alcohols having the formula R'OH, ethers having the formula R'OR'', aldehydes having the formula R'CHO, and mixtures thereof and heating said reaction mixture at a temperature of from about 60 to 80° C. at a reduced pressure until the reaction product has a ratio of from about 2.0 to about 3.5 atoms of chlorine per atom of platinum, where R' is a member selected from the class consisting of alkyl radicals containing at least 4 carbon atoms, alkyl radicals substituted with an aromatic hydrocarbon radical, and alkyl radicals substituted with an OR'' group, where R'' is a member selected from the class consisting of monovalent hydrocarbon radicals free of aliphatic unsaturation and monovalent radicals free of aliphatic unsaturation and consisting of carbon, hydrogen and oxygen atoms, with each oxygen atom being attached to two other atoms, one of which is a carbon atom and the other of which is a member selected from the class consisting of a carbon atom and a hydrogen atom, and thereafter heating the mixture of ingredients at elevated temperatures to effect vulcanization of the synthetic rubber.

8. The process for effecting vulcanization of chlorosulfonated polyethylene which comprises incorporating therein chloroplatinic acid octoate in an amount equal to from 0.1 to 10 percent, by weight, based on the weight of the chlorosulfonated polyethylene, and thereafter heating the mixture of ingredients to effect vulcanization, the said chloroplatinic acid octoate being prepared by forming a reaction mixture of (A) chloroplatinic acid with (B) at least 2 moles per gram atom of platinum of n-octyl alcohol, and heating said reaction mixture at a temperature of from about 60 to 80° C. at a reduced pressure until the reaction product has a ratio of from about 2.0 to about 3.5 atoms of chlorine per atom of platinum.

9. The process for effecting vulcanization of chlorosulfonated polyethylene which comprises incorporating therein chloroplatinic acid pentanoate in an amount equal to from 0.1 to 10 percent, by weight, based on the weight of the chlorosulfonated polyethylene, and thereafter heating the mixture of ingredients to effect vulcanization, the said chloroplatinic acid pentanoate being prepared by forming a reaction mixture of (A) chloroplatinic acid with (B) at least 2 moles per gram atom of platinum of n-pentanol, and heating said reaction mixture at a temperature of from about 60 to 80° C. at a reduced pressure until the reaction product has a ratio of from about 2.0 to about 3.5 atoms of chlorine per atom of platinum.

No references cited.

JOSEPH L. SCHOFER, *Primary Examiner.*

D. K. DENENBERG, *Assistant Examiner.*